May 18, 1965 SHOHEI FUJISHIMA ETAL 3,184,012
PREFABRICATED HOUSE STRUCTURES
Filed March 8, 1961 7 Sheets-Sheet 1

INVENTORS
SHOHEI FUJISHIMA
TOKUSABURO ISHIMOTO

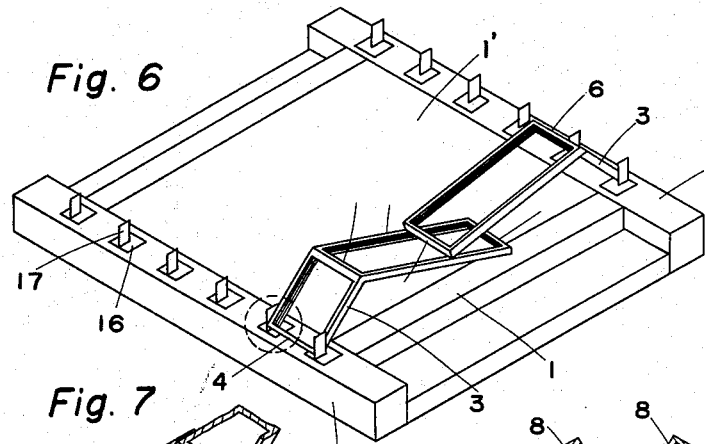
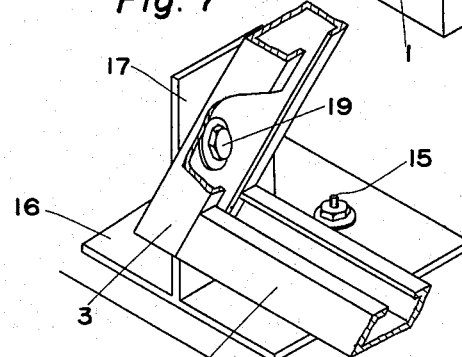
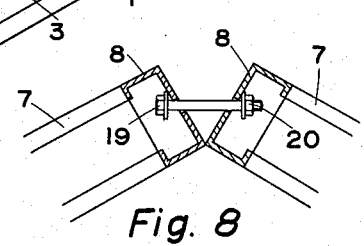
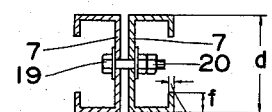
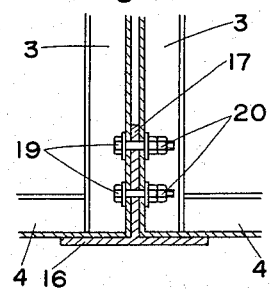
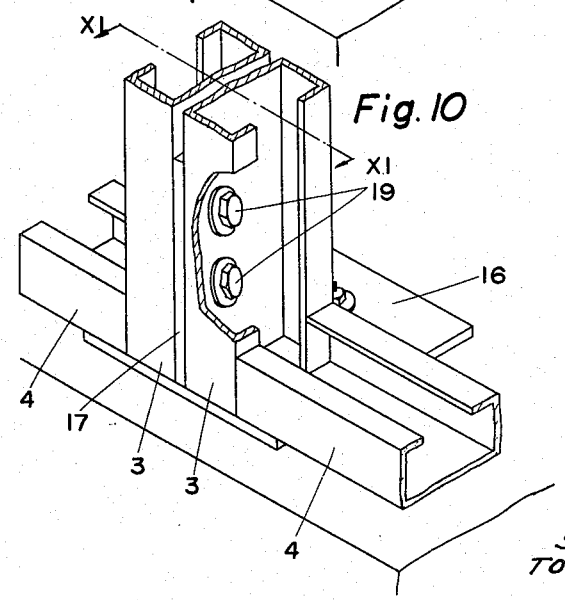

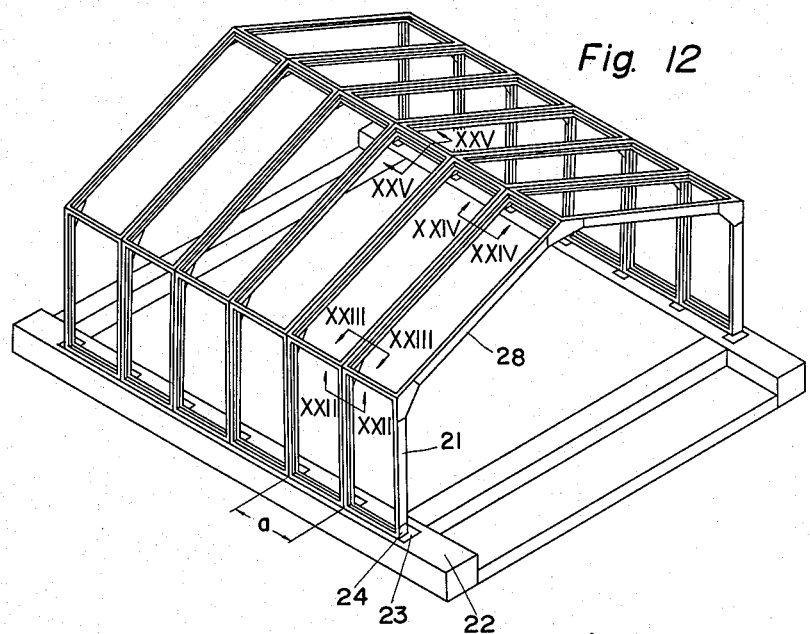
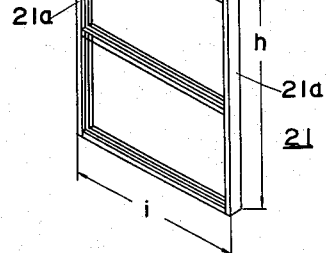
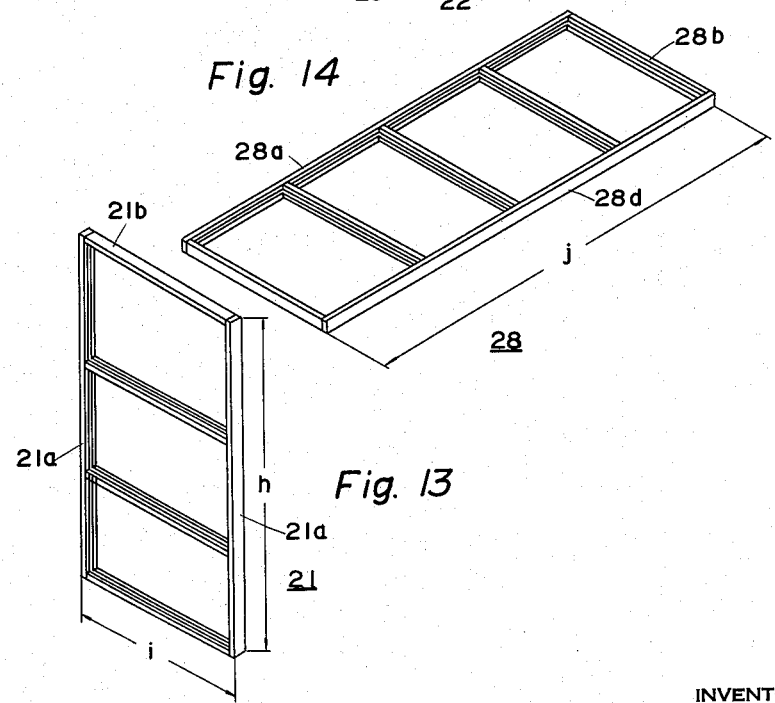

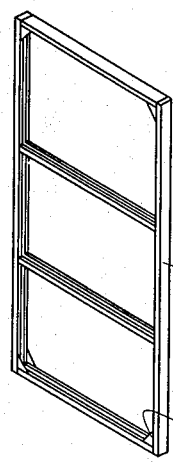
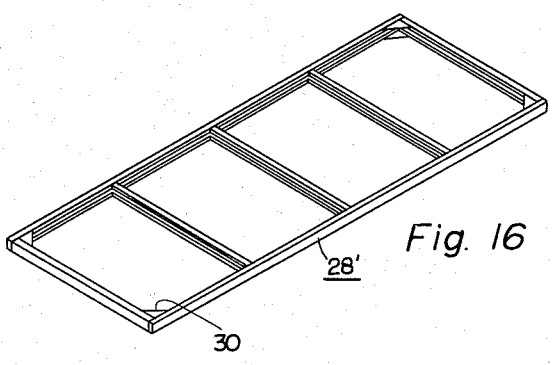
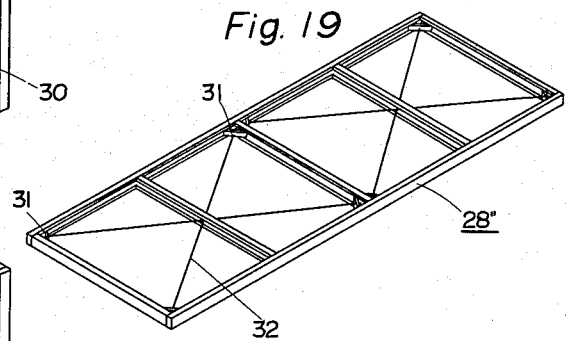
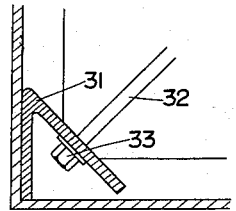
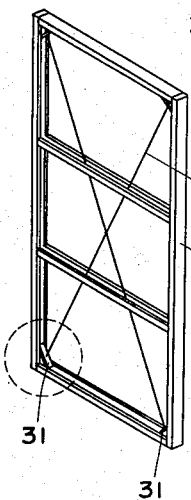

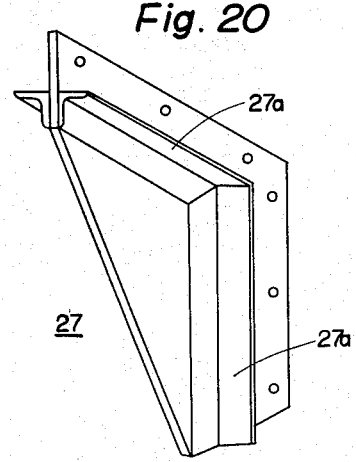
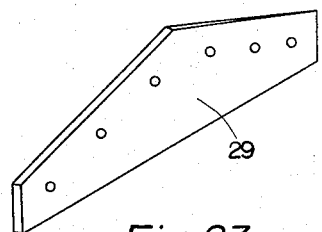
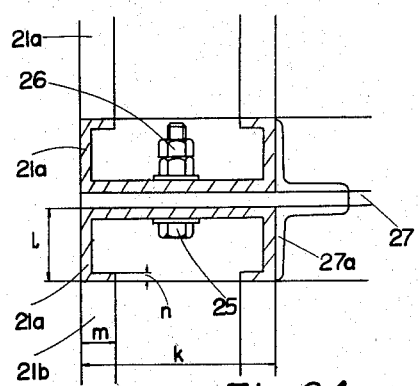
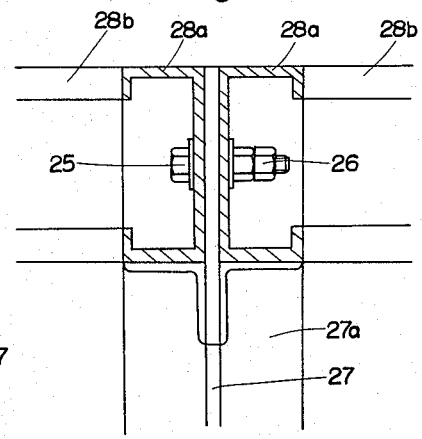
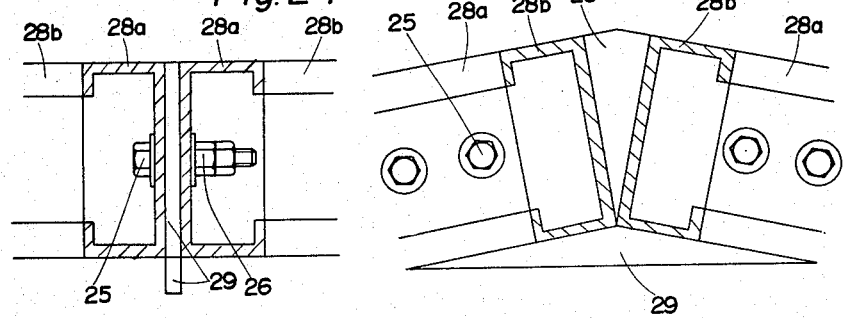

INVENTORS
SHOHEI FUJISHIMA
TOKUSABURO ISHIMOTO

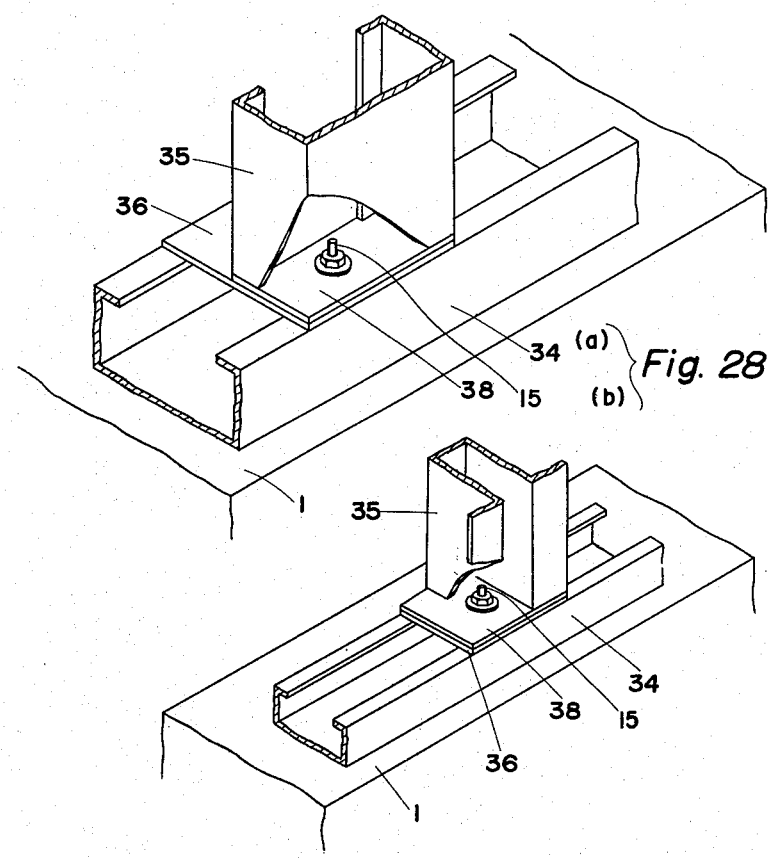
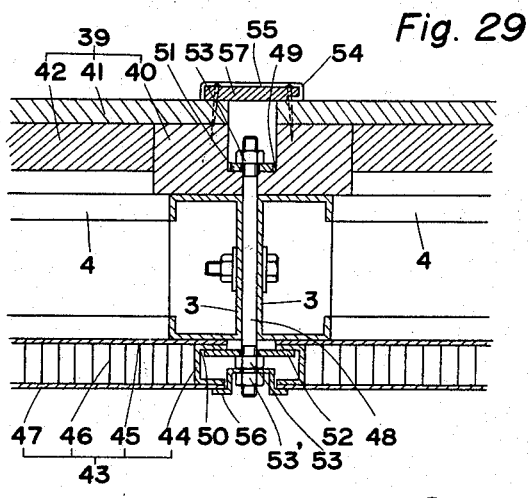

United States Patent Office
3,184,012
Patented May 18, 1965

3,184,012
PREFABRICATED HOUSE STRUCTURES
Shohei Fujishima and Tokusaburo Ishimoto, Kita-ku, Osaka, Japan, assignors to Sekisui Kagaku Kogyo Kabushiki Kaisha, Osaka, Japan, a corporation of Japan
Filed Mar. 8, 1961, Ser. No. 94,228
Claims priority, application Japan, Apr. 17, 1960, 35/21,875; Sept. 14, 1960, 35/46,993
1 Claim. (Cl. 189—1)

This invention relates to improvements in prefabricated house structures.

In general, a desired prefabricated house is such that a layman can construct it with ease and rapidity and without the necessity of any skill whatsoever. In the heretofore-known prefabricated houses, not much skill was required in the assembly of those parts other than the frame members of a house, but in assembling the frame member it was necessary to have a skill of experienced craftsmen which a layman does not possess. Furthermore, the house that was constructed was only intended as a shack of temporary use and was not such that it could ever be used safely for many years as a dwelling.

Accordingly, it is an object of this invention to provide a prefabricated house structure that can be fabricated very rapidly by a layman with materials manufactured uniformly at the factory and transported to the construction site.

Another object of the instant invention is to provide a prefabricated house which can be used safely as a dwelling for a great number of years despite the fact that it has been built rapidly.

Other objects and advantages of the present invention will become apparent from the following detailed description and will be particularly pointed out in the appended claims.

According to the invention, the above-mentioned objects and advantages can be achieved by a structure which comprises two rows of units erected on top of a foundation established on a house lot, each unit comprising a wall component and a roof component, all of which are of uniform width, said units having a

-shaped profile. The upper ends of the roof components of respective pairs of units that face each other are in abutting relationship to form a gable roof form, and are secured together where they abut. The lower ends of the wall components are secured to the foundation.

Figure 1:
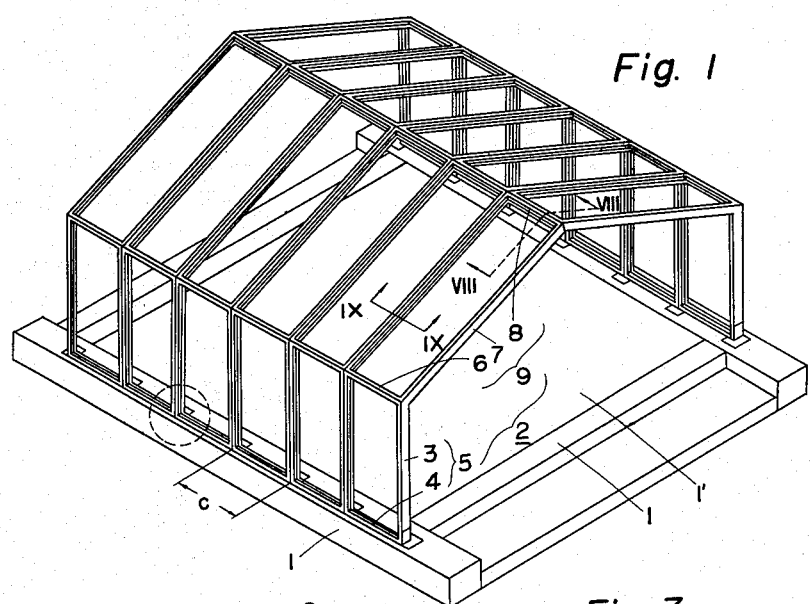
Figures 2, 3, 5:
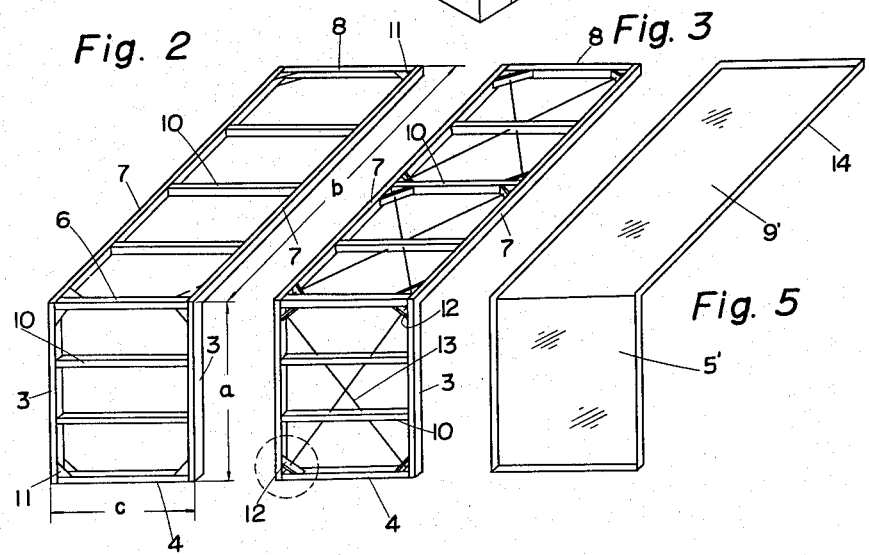
Figure 4:
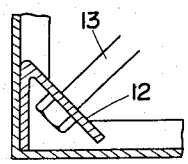

In order to facilitate the understanding of the present invention, the invention will be described with reference to embodiments thereof as shown in the accompanying drawings, wherein:

FIGS. 1 to 11 illustrate a typical embodiment of the invention:

FIG. 1 being a perspective view showing the units which have been erected contiguously;

FIGS. 2, 3 and 5 showing examples of other types of units different from the one shown in FIG. 1;

FIG. 4 being an enlarged front section of the circled part of FIG. 3 with dotted line;

FIG. 6 being a perspective view to show the method of erecting the units;

FIG. 7 being an enlarged perspective view of the circled part of FIG. 6 with dotted line;

FIG. 8 being a sectional view taken along the line VIII—VIII of FIG. 1;

FIG. 9 being a sectional view taken along the line IX—IX of FIG. 1;

FIG. 10 being an enlarged partly cut away perspective view of the circled part of FIG. 1 with dotted line;

FIG. 11 being a sectional view taken along the line XI—XI of FIG. 10;

Another embodiment of the invention is illustrated in FIGS. 12–25;

FIG. 12 being a perspective view showing the units which have been erected contiguously;

FIGS. 13 and 14 being perspective views of a wall component and a roof component, respectively;

FIGS. 15 to 17 and 19 being perspective views of construction examples using the modified wall and roof components;

FIG. 18 being an enlarged front section of that part of FIG. 17 shown circled with a dotted line;

FIG. 20 being a perspective view of a gusset plate;

FIG. 21 being a perspective view of a ridge joint plate; and

FIGS. 22 to 25 being sectional views taken along the lines XXII—XXII, XXIII—XXIII, XXIV—XXIV, and XXV—XXV of FIG. 12, respectively.

Figure 26:
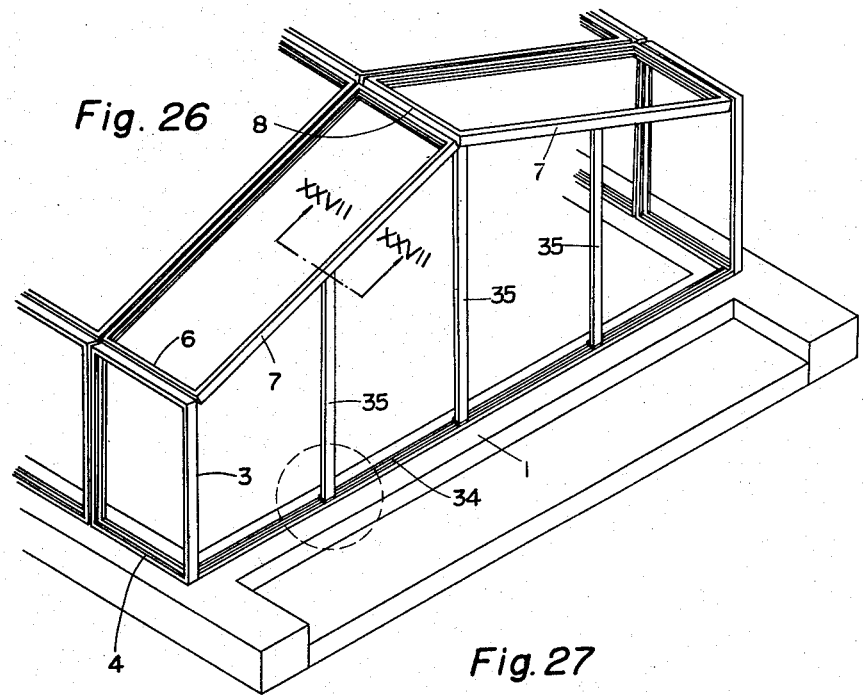
Figure 27:
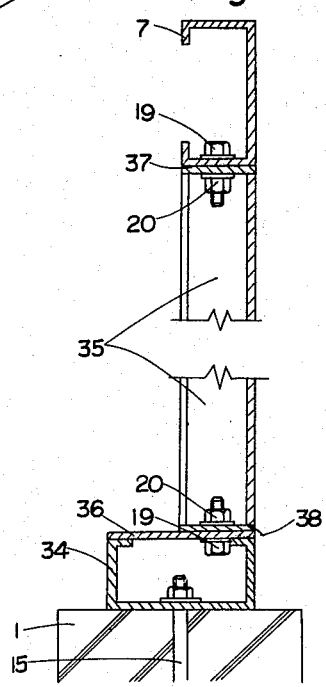

FIGS. 26 to 28 illustrate how the steel members of the gable side are secured:

FIG. 26 being a perspective view showing the securing method of a column between a gable side sill 34 and a principal rafter 7 of unit 2;

FIG. 27 being a sectional view taken along the line XXVII—XXVII of FIG. 26; and

FIG. 28a being an enlarged perspective view of that part of FIG. 26 circled with a dotted line, and FIG. 28b being the modification thereof.

FIG. 29 is a cross-sectional view showing an example of a construction wherein the inside and outside panels have been secured to the units made of channel steel.

FIGS. 1 to 11 illustrate a typical embodiment of the present invention. In FIG. 1, 1 is a foundation that has been constructed on a residential lot. This foundation may be either of poured concrete or that of concrete blocks. If an example of how the foundation is constructed on a residential lot is given, it may be done such as follows: First, the location of the foundation to be constructed is laid out by accurate measurements and leveling of the site. Then excavation is performed, and gravel is laid in the ditch excavated to place the foundation. (The bottom of ditch is then leveled with an application of leveling concrete.) Above this, in the ditch are set up the two sides of the forms for pouring in concrete, and concrete is poured into the cavity formed therebetween. After hardening of concrete by removing the forms the concrete foundation is completed. During the construction of the concrete foundation, anchor bolts are set in place to secure the units to the foundation as will be described later. In setting the anchor bolts in the concrete foundation, while they may be set in at the time when the poured concrete is still in a soft state, to ensure their accurate positioning it is advantageous to open up a hole somewhat larger than the diameter of the anchor bolt, while the concrete is still soft, in the spot where the anchor bolt is to be installed, inserting the anchor bolts in these holes after the concrete has hardened and thereafter filling the gaps surrounding the anchor bolts with cement mortar.

On the other hand, when the foundation is constructed with concrete blocks, similarly as in the case of poured concrete foundation, first, excavation is performed at the construction site where the foundation is to be laid. Then gravel is laid in the bottom of the ditch excavated, and footing concrete is placed above the gravel. The concrete blocks can then be put up on this flat surface to a suitable height. The concrete blocks should be laid in full beds of mortar, or in order to reinforce the concrete block foundation, reinforcing steel bars may be placed in mortar joints of the concrete blocks.

In FIG. 1, 1' is a concrete floor slab that has been constructed within the inside of foundation 1. In order to make a concrete floor in the inside of the foundation 1, the area surrounded by the foundation 1 shall be filled with as good a quality of soil as possible. After wetting soil and compacting it repeatedly, gravel is laid on this area followed by filling in with sand to level out the unevenness of the gravel. For moisture proofing from the ground, a polyethylene film, for example, is laid over it. And on top of this, for purpose of insulation, cellular material such as a cellular polystyrene board is placed. On top of this concrete is poured up to about the desired floor height, which may be then finished by applying mortar on the surface of the concrete to obtain a smooth and beautiful surface as well as the desired floor height.

For obtaining the desired floor height and leveled floor, following method is recommended. After filling and compacting it, stakes may be driven in several places. Then the desired floor height shall be marked to the stakes, these marks shall be used as a guide in pouring the concrete and in finishing it with mortar. This way, the top of the mortar finish shall agree with the desired floor height. The stakes are later removed with the holes resulting thereby being filled with mortar. The construction of the concrete floor within the bounds of the foundation may be done either before or after the units have been secured to the foundation, as described hereinafter.

2, 2 are the units having a uniform width to be used in this invention. These units 2, 2 are $$\Bigl\lgroup$$

shape frame-like units which consist of two components being welded together integrally. The one is a vertical wall component made up of post 3, 3 and a sill 4 and the other is an inwardly and upwardly directed roof component 9 made up of a girder 6, principal rafter 7, 7 and a ridge 8. The posts 3, 3, the sill 4, the girder 6, the principal rafters 7, 7 and the ridge 8 are all made up of channel steel with their joints all being welded.

For purpose of illustration, if the dimensions are given of these frame units, the measurements of each of the parts as indicated by the small letters of the alphabet in FIGS. 2 and 9 are as follows:

$a=2450$ mm.; $b=3200$ mm.; $c=900$ mm.; $d=60$ mm.; $e=30$ mm.; $f=10$ mm.; $g=2.3$ mm.

For members of the frame units, besides the above-illustrated channel steel, there may be used such as angle iron or various steel shapes as well as pipes, etc.

In order to reinforce the frame units shown in FIG. 1 in their construction, crosspieces 10 may be fixed between the posts 3, 3 and the principal rafters 7, 7, as shown in FIGS. 2 and 3. Further, as shown in FIG. 2, a triangular gusset plate 11 may be installed at the corners where the various main structural members intersect. Or, as shown in FIG. 3, slanting gusset plates 12 may be fitted at the intersecting point of the various main structural members. Bracings 13 may then be installed tying opposing brace joint plates 12 diagonally, nuts 18 as shown enlarged in FIG. 4 being used to tighten the said bracings 13. The gusset plates 12 may be welded to the units, or as described hereinafter, they may be bolted to the units together with the same bolts and nuts that are used for joining the units at the time the units are placed alongside each other, and the erection thereof are effected.

While the units of a uniform width, as used in the invention, may be of frame structure formed by a suitable combination of steel shapes by means of such as welding as described hereinabove, it is also possible, as shown in FIG. 5, to take a metallic plate of a uniform width and bend the same so that it will assume a $$\Bigl\lgroup$$

shape when viewed from the side, that part below the bend being made to be the wall component whereas that above the bend being made to be the roof component 9'. The 14 in FIG. 5 is a bent edge provided at the perimeter of the unit to facilitate joining of the units to each other. Furthermore, as such a board-like unit, a reinforced synthetic resin of such as polyester resin being reinforced with glass fibers molded into one piece and having a $$\Bigl\lgroup$$

shape as viewed from the side may also be used.

In erecting the units 2, 2 above the foundation 1, as shown in FIG. 1, the two units 2, 2 are first placed on top of the foundation 1 with their insides facing said foundation and the parts of roof components 9 being placed one on top of the other while the respective wall components 5 at their bottom are, as shown enlarged in FIG. 7, first pivotally attached by means of their respective bolts 19 to uprights 17 of base plates 16 secured to the foundation 1 by means of anchor bolts 15. Using the bolts 19 as pivots, the unit 2, 2 are then raised so as they face each other, and the ridges 8, 8 are abutted against each other. The ridges 8, 8 are then joined together by means of bolts 19 and nuts 20 as illustrated in FIG. 8. Thus the erection of the two units 2, 2 is completed.

If a ridge joint plate, as hereinafter described in connection with a modified embodiment, is fitted at the point where the two ridges face each other, the strength of the joining at this point can be greatly heightened.

The erection of other units alongside these units 2, 2 are accomplished one after the other in succession, and each of the units 2, 2 are joined to their continuous units by means of bolts and nuts 19, 20 which tighten together the principal rafters 7, 7 continuous to each other as shown in FIG. 9. On the other hand, at the lower end of the posts 3, the units are secured firmly together by means of bolts and nuts 19, 20 with the intervention of the upright part 17 of the base plate 16.

The order in which each of the units are erected above the foundation need not however, be restricted to the method described above wherein two units are first erected at one end of the foundation and then the others are erected alongside in successive order, but any order of erection is permissible.

Moreover, the raising of the units above the foundation is not restricted to the method illustrated above. For example, the two units facing each other in a state in which their ridges butt against each other and lie on their sides, after the abutting ridges have been joined with joint bolts, may be raised sidewise, and the lower ends of the respective wall components may then be secured to the base plates.

Also, while in the above embodiment the securing of the units to the foundations and the joining of each of the units with its adjoining unit have been performed by means of bolts and nuts, as means of securing or joining the units, it is to be understood that a restriction to only bolts or nuts is not intended at all, it being possible to use other means such as riveting, etc. For this securing or joining means, it is however preferred that a means be adopted such as that by means of bolts and nuts, as described hereinabove, in which no skill whatsoever is required and which can be easily performed by even a layman.

Further, to ensure that the bolts and nuts do not loosen in case bolts and nuts are used to secure the units to the foundation as well as to each other, it is desirable to use washers between the units and the bolts and nuts, and also that the nuts be doubled.

Another embodiment of the present invention is illustrated in the accompanying drawings, FIGS. 12 to 25.

This embodiment is an instance of a method of erecting the units where the wall component and roof component that constitute a unit are each a separate frame capable of being assembled into a unit. These wall component and roof component are in all cases those in which shape steels, pipes, etc. have been made up into a rectangular shape and welded together. FIG. 13 shows a wall component 21 framed into a rectangular shape using channel steels 21a and 21b, while FIG. 14 shows a roof component 28 of a width equal to that of the wall component 21 framed with rectangular shape channel steels 28a and 28b.

If an example of the dimensions of these wall and roof components and the channel steel used in constructing the same are given, the measurements of the respective parts as indicated by the small letters of the alphabet in FIGS. 13, 14 and 22 are as follows:

$h=2450$ mm.;    $i=900$ mm.;    $j=3200$ mm.;
$k=60$ mm.;    $l=30$ mm.;    $m=10$ mm.;
$n=2.3$ mm.

In order to strengthen still further the construction of these wall and roof components, as shown in FIGS. 15 and 16, a triangular gusset plate 30 may be fitted to the corners where the main structural members intersect in the wall component 21' and roof component 28', or as shown in FIGS. 17 and 19, a slanting brace joint plate 31 may be fitted to the intersecting points of the main structural members of the wall component 21″ and roof component 28″, and a bracing 32 may be installed connecting the brace joint plates 31 placed diagonally opposite to each other, and bracings 32 may then be tightened with a nut 33 as shown magnified in FIG. 18.

The slanting brace joint plates 31 may be either welded to the units, or as described hereinafter, fitted to the units together with the same jointing bolt that is used at the time the continuous units are bolted together.

In erecting these wall components 21 and roof components 28, first a plurality of the wall components 21 are secured, as shown in FIG. 12, perpendicular to the foundation 22 successively and in two rows facing each other through the intervention of uprights part 24 of base plates 23, which have been in advance secured in two rows to the foundation 22 with suitable spacing by means of such as anchor bolts. Thus, the two wall sections are formed facing each other. Then a half of a gusset plate 27 having a flange 27a as shown in FIG. 20 are inserted between the top parts of adjoining wall components 21 and secured with bolts 25 and nuts 26 as shown in FIG. 22.

Next, the roof components 28 at their one ends with the exposed half part of the gusset plates 27 fitted to the wall components 21 intervening are secured to the adjoining roof components 28 in succession with bolts 25 and nuts 26 as shown in FIG. 23.

The other ends of the roof components 28, which at their one ends have been attached, as above, to both of the wall components 21 facing each other, are made to butt with the required angle as to face each other, and at the points of their abutment with a ridge joint plate 29 intervening as shown in FIG. 21 are secured to their respective adjoining roof components 28, 28 with bolts 25 and nuts 26 as shown in FIGS. 24 and 25, thus forming a gable roof. By performing this operation successively from the forward part of the girder to the rear part of the girder the erection of the skeleton structre of the prescribed size is completed.

The sequence of assembly of the various components is not to be restricted to that illustrated above, it being possible to adopt any other sequence that is desired. For example, before attaching the wall component to the foundation, the roof component may be attached beforehand to the top part of the wall component using the gusset plate so as to form the afore-described shaped unit, which can then be erected in the same order as described in connection with FIGS. 1 to 11.

After having erected the units above the foundations as described in the hereinbefore described two embodiments, the structural members of the gable side are installed. To the wall components of each of the units are attached at their inside and outside respectively inside wall panels and outside wall panels, and to the roof components to the inside and outside thereof are attached respectivel ceiling anr roofing panels. On the other hand, to the structural members of the gable side are installed the windows and doors, and by the further installation of other inside and outside wall panels the house is completed.

In case however when as described in connection with the first embodiment a unit comprising a broad-like material, as shown in FIG. 5, has been used, wall and roof panels need not necessarily be attached to the wall component 5' and the roof component 6'. Since the wall component itself and the roof component itself of the unit may respectively become the wall and roof, one need only install the necessary inside panels in this case.

When, as in the hereinbefore described two embodiments, the units have been constructed of channel steel and likewise the structural members of the gable side have been also constructed of channel steel, a method of attaching the structural members of the gable side frame to the units that have been erected above the foundation will be described below while referring to the drawings. As shown in FIGS. 26 and 28, by screwing a gable side sill 34 made the channel steel with an anchor bolt 15 embedded in the foundation 1 the gable side sill 34 is secured to the foundation as shown in FIG. 26. On top of the gable side sill 34 where a post 35 is to be erected a post joint plate 36 is welded as shown in FIGS. 27 and 28. On the other hand, to the top and bottom ends of the post 35 joint plates 37, 38 are welded respectively. Then the joint plate 38 at the bottom end of the post 35 is placed on top of the post joint plates 36 of gable side sill 34, and joint plates both 36 and 38 are secured together with a bolt and nut 19, 20. The joint plate 37 at the top end of the post 35, on the other hand, can be placed against the underside of the principal rafters 7 of the unit 2 and the two secured together with a bolt and nut 19, 20. As the gable side post 35, for example, besides the channel steel of ⊓ section, as illustrated in FIG. 28a, that such as of a hat-shape. i.e., ⌶ section as illustrated in FIG. 28b may also be used.

Next, while referring to the drawings an example of a method of attaching inside panels and outside panels to the respective insides and outsides of the units when they have been constructed with channel steel as in the hereinbefore described two embodiments will be described.

In FIG. 29, 3, 3 are posts of two adjoining units 2, erected on top of the fundation 1 in a state of back to back position as shown in FIG. 1. 39 is a finished inside panel consisting of a frame 40, a plaster board 41 and a sponge 42, and 43 is a finished outside panel consisting of a frame 44, a hard polyvinyl chloride sheet 45, a honeycomb 46 and an aluminum sheet 47. In between the posts 3, 3 with their backs facing each other, there is provided a bolt 48 having threads at both ends thereof. By placing washers 51 and 52 which is fitted to the ends of the bolt 48 against the stepped sections 49, 50 that have been provided respectively at the edges of the inside panel 39 and the outside panel 43 and screwing a nut 53 to the both ends of the bolt 48, the inside panel 39 and outside panel 48 are attached to the post 3. To cover the joint of the inside panels 39 a joiner 57 can be nailed to the inside panel 39 with nails 54, and a hard polyvinyl chloride joiner 55 can then be snapped on top of the joiner 57 utilizing its elasticity. On the other hand, at the joint of the outside panels 43, by attaching a sheet metal joiner 56 by means of screwing a nut 53' to the bolt 48, rain water, etc. from the outside can be prevented from coming through the joint.

In the present invention, a constituent unit of the framework of the house comprises units of uniform width consisting of a wall component and a roof component. A suitable number of the units face each other with the uppermost ends of the roof components of the units abutting against each other to form a gable roof. At the point where the roof components abut, they are joined together. The lower ends of the wall components of the units are secured to the foundation. Thus, since the construction is such that the units have been used as the structural members, and the point of the roof component that abuts against each other and the two points at the bottom of the wall component have been hinged, it becomes what is referred to in structural engineering as a three-hinged construction. Therefore, the prefabricated house, according to the present invention, is remarkably durable and can be used safely over a long period of time as a dwelling.

Inasmuch as in accordance with the invention, a unit consisting of a wall component and a roof component of uniform width is used as a constituent unit of the frame of the house, and the whole frame member of the house is constructed by joining a suitable number of these units, a house with the desired size as to its floor area can be constructed. Moreover, if these units are manufactured uniformly, interchangeably and in advance at a factory with materials which possess sufficient strength as a frame member for a house, the frame of the house can be erected at the construction site of the house by merely joining the units, and it will require no skill at all in the erection of the frame of the house as compared with the case of the conventional prefabricated house.

Furthermore, in case the wall component and roof component that constitute the unit are made into separate frames that are capable of being assembled later as in the second embodiment illustrated, there is the advantage in case of hauling the units from the factory to the construction site in that the units can be hauled in a state in which the wall and roof components are disassembled as to reduce their bulkiness.

In addition, since the joining of the components are effected by using base plates, gusset plates and ridge joint plates, which are secured by means of bolts and nuts, neither special technique nor skill is required, that is, a layman can easily and rapidly erect the units. Moreover, the house that has been thus erected is very durable, and strong.

While preferred embodiments for performing the invention have been described above, it is to be understood that the invention is not to be limited thereby but is to include all modifications and changes insofar as the same do not depart from the spirit of the invention.

Having thus set forth the nature of the invention, what is claimed is:

A prefabricated house structure having side walls and a gable roof, said structure comprising a foundation, two rows of units facing each other erected on top of said foundation, each of said units being of uniform width, and being formed of a vertical wall component having a lower and an upper end and an inwardly and upwardly directed roof component having a lower and an upper end, said wall and roof components being rectangular frames formed from elongated structural members, said side walls being formed of two rows of said spaced-apart wall components, each wall component laterally abutting, and being secured to, at least one other wall component, and said gable roof being formed of two rows of said roof components upwardly inclining from the upper ends of said side walls and spanning the space between said side walls, said upper ends of said roof components abutting each other and being secured together approximately midway between said side walls, base plates fixed to said foundation and provided with upright members, said upright members being interposed between said abutting wall components at their lower ends, means to secure said wall components to said upright members, gusset plates fixedly attached to said upper ends of said wall components and said lower ends of said adjoining roof components, ridge plates interposed between said abutting roof components, and means to secure to said upper ends of said abutting roof components to said ridge plates.

References Cited by the Examiner
UNITED STATES PATENTS

| 1,375,402 | 4/21 | McAvoy | 50—64 |
| 2,023,814 | 12/35 | Lindsey | 189—1 |
| 2,365,579 | 12/44 | Mulligan | 20—2 |
| 2,453,326 | 11/48 | Lambert | 20—2 |
| 2,480,330 | 8/49 | Kump | 50—64 |
| 2,602,968 | 7/52 | Simon | 20—2 |
| 2,666,507 | 1/54 | Ruark | 189—2 |
| 2,801,716 | 8/57 | Colby | 189—1 |
| 2,816,329 | 12/57 | Sogaro | 20—2 |

FOREIGN PATENTS 459,622  1937  Great Britain.

RICHARD W. COOKE, Jr., *Primary Examiner.*
WILLIAM I. MUSHAKE, JACOB L. NACKENOFF,
*Examiners.*